S. W. LUDLOW.
VEHICLE SPRING AND AXLE.

No. 191,536.

2 Sheets—Sheet 1.

Patented June 5, 1877.

Attest
John E. Jones.
H. J. Atkins

Inventor
Sam'l W. Ludlow
By F. Millward
Attorney

N. PETERS, PHOTO-LITHOGRAPHER, WASHINGTON, D. C.

S. W. LUDLOW.
VEHICLE SPRING AND AXLE.

No. 191,536. Patented June 5, 1877.

2 Sheets—Sheet 2.

Attest
John E. Jones.
H. J. Atkins

Inventor
Saml. W. Ludlow
By F. Millward
Attorney

UNITED STATES PATENT OFFICE.

SAMUEL W. LUDLOW, OF CINCINNATI, OHIO.

IMPROVEMENT IN VEHICLE SPRINGS AND AXLES.

Specification forming part of Letters Patent No. 191,536, dated June 5, 1877; application filed January 13, 1877.

*To all whom it may concern:*

Be it known that I, SAMUEL W. LUDLOW, of Cincinnati, Hamilton county, State of Ohio, have invented an Improvement in combined Spring and Axle for Vehicles, of which the following is a specification:

My invention consists, in the first part, in the provision, upon the rigid bar which connects the axle ends, of guiding-sockets, by which the ends of the spring or couplings thereof are encompassed and protected against forward and backward play in the progress of the vehicle.

My invention further consists in combining, with the said spring and connecting-bar for the axle ends, a guide-bar, flexible or otherwise, which has a guide bearing at the ends in the guide-sockets of the axle ends, so that it may act to protect the center of the spring against forward and backward play in the progress of the vehicle, while the said sockets, at the same time, preserve its ends against the same motion.

My invention further consists in combining, with the guide-sockets of the axle ends, suspension links or couplings, to which the ends of the spring are coupled or connected, the links being guided by the said sockets, and, in turn, serving to guide the ends of the spring.

Figure 1:
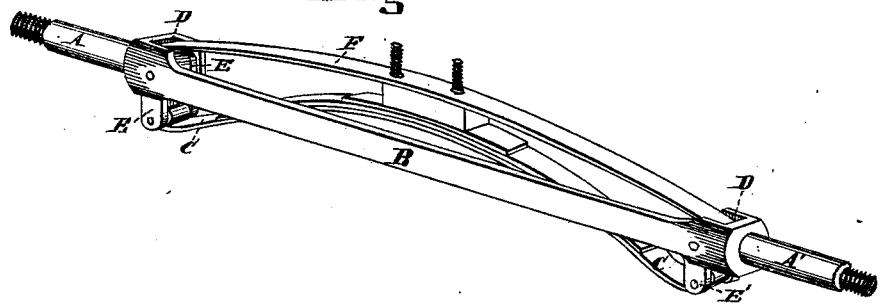
Figure 2:
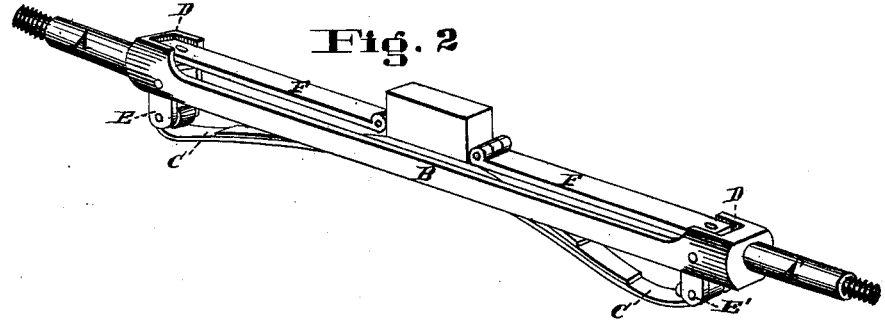
Figure 3:
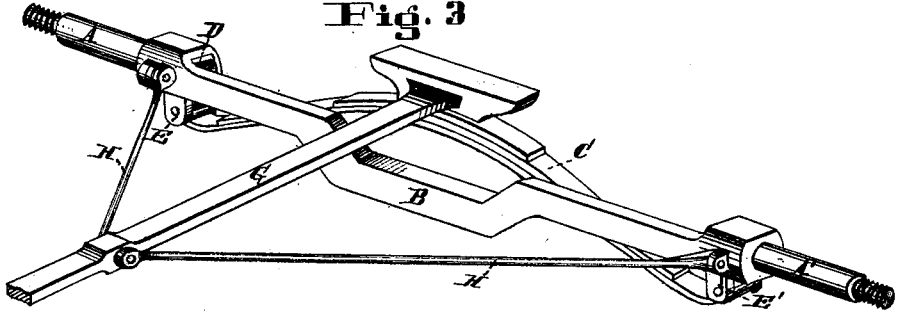
Figure 4:
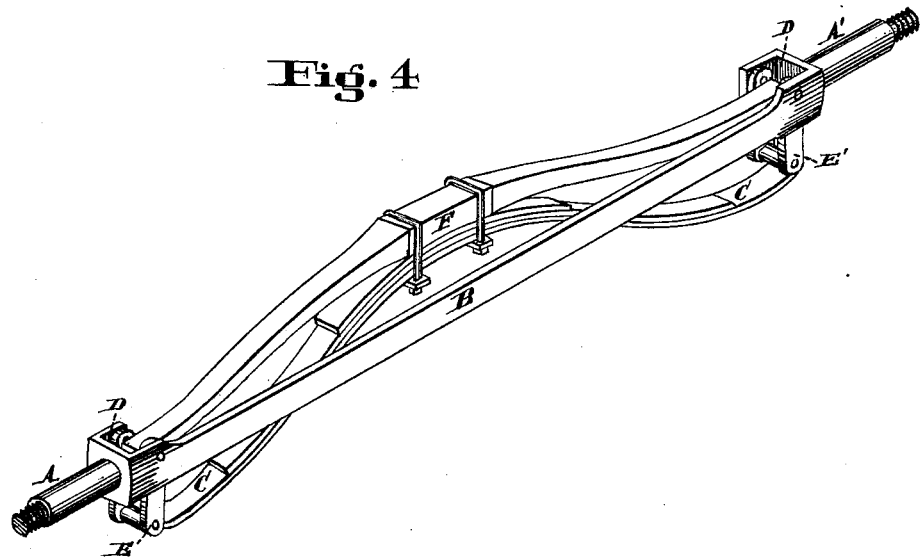
Figure 5:
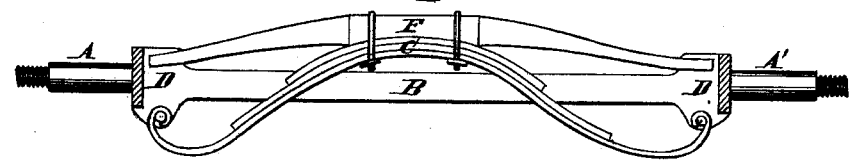

In the accompanying drawings, Figure 1 is a perspective view of my combined spring and axle when provided with a flexible guide-bar. Fig. 2 is a perspective view of the same when the guide-bar is jointed to give what may be called flexibility. Fig. 3 is a perspective view of the same when the guide-bar is omitted and the center of the spring protected from forward and backward play by braces. Fig. 4 is a perspective view of the same when the guide-bar is rigid and arranged to slide vertically in the guide-sockets at the ends between the links of the spring. Fig. 5 is an elevation of the same, partly sectioned, showing the way I dispense with the links.

A A' represent the axle ends upon which the carriage-wheels rotate; and B is a rigid bar located, as shown, outside of axes of the ends, so that the spring may be in the same vertical plane of the axes, and this bar rigidly secures the axle ends A A' together in all of the modifications shown. C is the spring. It is, as shown, in the same vertical plane as the axes of the wheels, and its ends are coupled below said axes, so that the body of the vehicle may be extremely low down, and yet the spring may have a great range of motion. The axle ends, at their junction with the bar B, have each a guide-socket, D, and in these sockets links E E' are suspended, and between these links the ends of the spring are coupled, as shown. The sockets D prevent the backward and forward play of the spring, the sockets inclosing the links, and the links, in turn, embracing the spring.

In order to effectually prevent any backward and forward play of the spring at the center, I combine, with the spring C, bar B, and axle ends, a guide-bar, F, whose ends rest and move in the sockets D, either endwise, as shown in Figs. 1 and 2, or vertically between the links, as shown, in Fig. 4. Where the bar F is omitted, I connect the coupling-pole G of the carriage to it at the middle, and brace the pole by side braces H to the axle ends, and this serves to confine the spring to vertical play.

In place of linking the spring, as shown, its ends may slide endwise in the sockets D, in the same way as the flexible bar F does in Fig. 1; or it may be suspended at the ends on single bolts, without links, the spring being, in that case, so extremely curved at the ends as to have the desired flexibility, without expansion and contraction in length between the points of suspension, as shown in Fig. 5. The body of the vehicle rests upon the top of springs C, and is there secured by any of the well-known means.

I claim—

1. In combination with the axle ends A A' and rigid bar B, the sockets D, for receiving the ends of the spring or guide-bar, or both, substantially as and for the purpose specified.

2. The combination of axle ends A A', rigid bar B, spring C, sockets D, and guide-bar F, connected and operating substantially as and for the purpose specified.

3. In combination with the axle ends A A', spring C, and bar B, having sockets D, the links E E', substantially as and for the purpose specified.

In testimony of which invention I hereunto set my hand.

SAMUEL W. LUDLOW.

Witnesses:
JOHN E. JONES,
A. S. LUDLOW.